United States Patent [19]

Shikler

[11] Patent Number: 5,655,810

[45] Date of Patent: Aug. 12, 1997

[54] COMBINATION AUTOMOBILE SUNSHIELD AND INTERIOR PROTECTIVE COVER

[76] Inventor: Arie Shikler, 375 Aster St., Laguna Beach, Calif. 92651

[21] Appl. No.: 647,842

[22] Filed: May 15, 1996

[51] Int. Cl.$^6$ ..................................... B60J 11/00
[52] U.S. Cl. ............... 296/136; 150/154; 160/370.21
[58] Field of Search .......................... 296/136, 95.1, 296/100, 97.7, 97.8, 180.1; 150/154, 166, 168; 160/370.21

[56] References Cited

U.S. PATENT DOCUMENTS

| | | | |
|---|---|---|---|
| 4,795,207 | 1/1989 | Clarke | 296/136 |
| 4,828,319 | 5/1989 | Benson | 296/136 |
| 4,972,892 | 11/1990 | Yeh | 296/136 |
| 5,031,684 | 7/1991 | Soong et al. | 296/97.8 |
| 5,201,565 | 4/1993 | Berardino | 296/136 |

Primary Examiner—David M. Mitchell
Assistant Examiner—Hoa B. Trinh
Attorney, Agent, or Firm—Francis X. LoJacono

[57] ABSTRACT

The present invention comprises an automobile sunshield in combination with an interior sunshade having an elongated cover provided with a reflective surface and a non-reflective surface with the dual purpose of providing a radiation protective cover and a visual security cover, the interior sunshade portion being readily mountable so as extend rearwardly to cover at least the driver's side of the vehicle, so that the steering wheel and the driver's seat are covered, whereby the combination not only protects the covered area from the rays of the sun but also provides the visual security cover that hides the area from view from the outside of the vehicle.

11 Claims, 2 Drawing Sheets

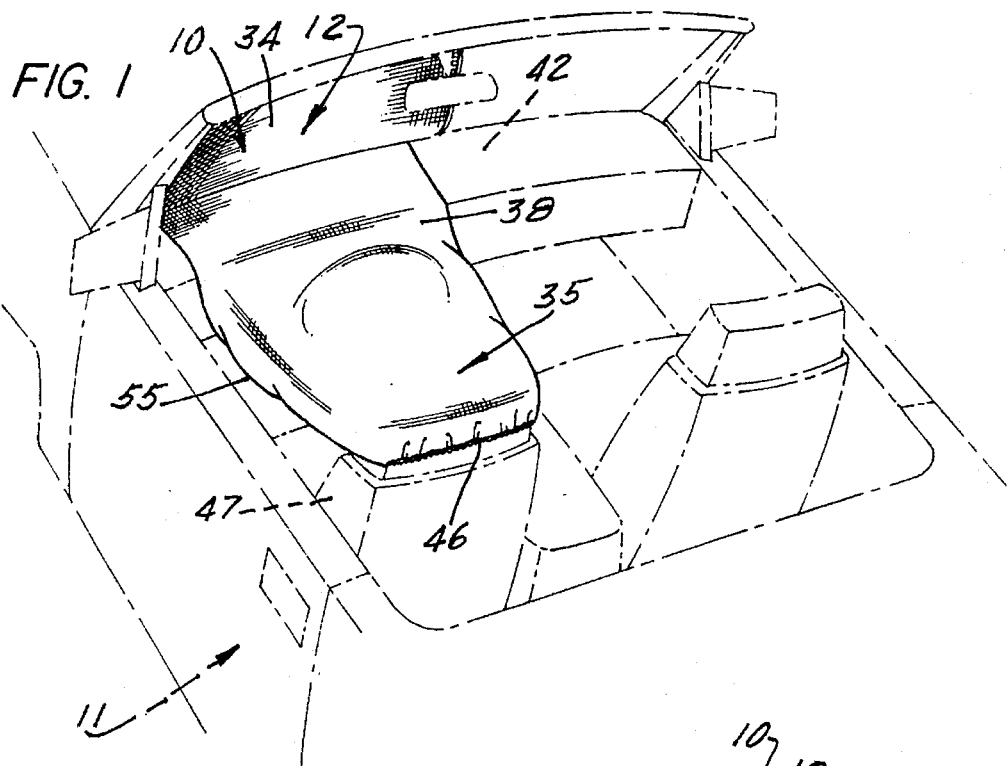
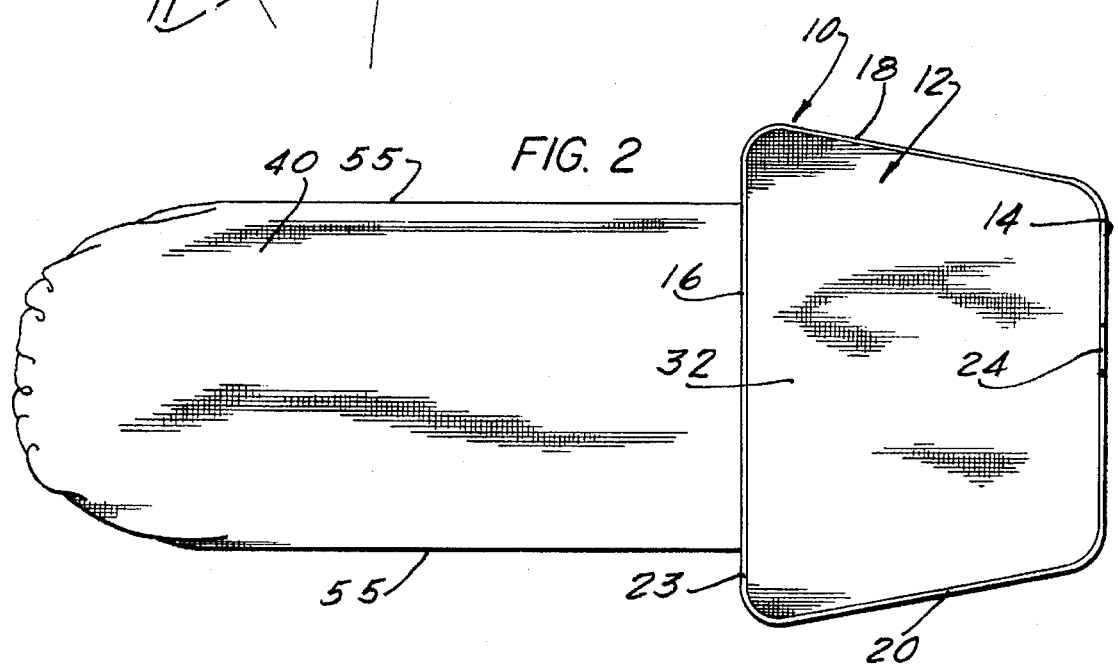
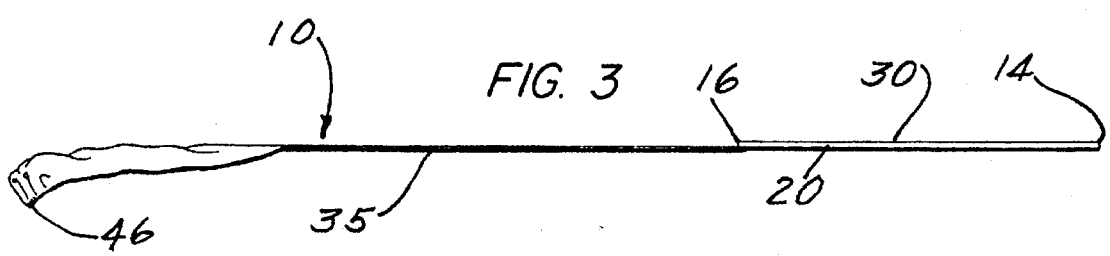

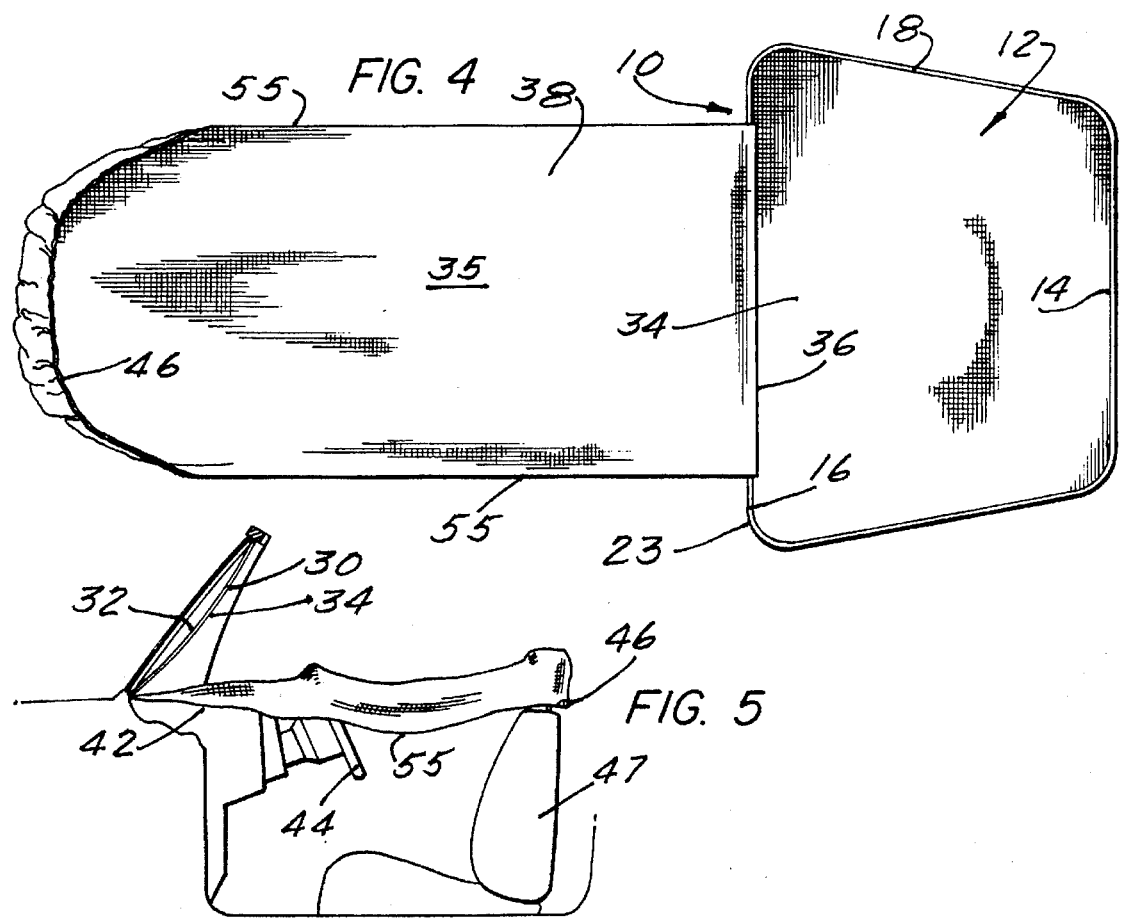
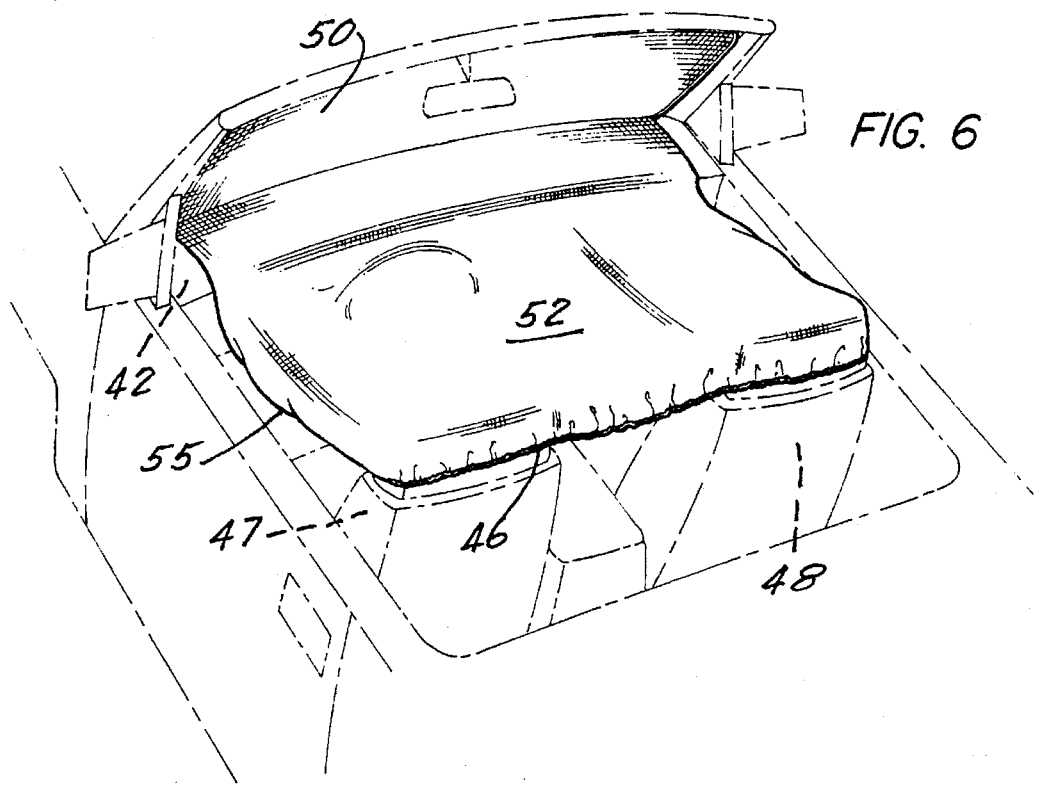

COMBINATION AUTOMOBILE SUNSHIELD AND INTERIOR PROTECTIVE COVER

BACKGROUND OF THE INVENTION

1. Field of the Invention

The present invention relates generally to a sunshade or otherwise referred to as a sunshield for automobiles, and more particularly to a sunshield in combination with an interior protective cover means which defines both an interior sunshade means and a visual security means, wherein the interior protective cover means is arranged to protect at least the driver's side of the vehicle from the sun's rays, and wherein the visual security means encloses the steering wheel and the driver's seat area, thus preventing visual access to that area covered.

2. Description of the Prior Art

As is well known in the art, there are many suitable means to protect the interior of a vehicle from the sun's rays by employing one of the many different arrangements of sunshields or sunshades. Some sunshade devices comprise foldable paper-type products that are generally folded in an accordion arrangement. These types of sunshades have a very short usable life span due to the structural material from which they are constructed. Like other sunshades or sunshields as will hereinafter be identified, none have the ability to prevent the sun's rays from entering through the side windows of the vehicle.

Accordingly, this presents other outstanding problems that have not been completely addressed heretofore. These are caused by the uncovered side windows of the vehicle resulting in the steering wheel and seats becoming sometimes unbearably hot to touch, especially during summer weather when the interior of the vehicle can become exceedingly hot and light clothing is usually worn. This is, of course, particularly detrimental to the driver of the vehicle. The following two known U.S. Patents attempt to address this problem but in a limited way.

In U.S. Pat. No. 4,815,784 there is disclosed an elongated sunshield that includes a plurality of adjacent collapsible loop members. The flexible loop members are covered with a suitable material so as to cover the entire front window, that is, the windshield of the vehicle. It also shows that it can be employed to cover the side windows as well, but one must purchase two or more sunshield units to protect the interior of the vehicle. In other words one would be required for the side windows and another for the front windshield.

In U.S. Pat. No. 5,024,262 there is disclosed a sunshade device similar to that of the above-mentioned patent. This patent is different because it only uses a single frame structure such as a single elongated loop which is continuously deformable so as to fit a predetermined contour of the automobile window. But it, too, is limited in its protection from the rays as the sun changes its position relative to the windshield which is covered by the sunshade device of the invention. There is no suggestion of protecting the dashboard, the steering wheel or the drivers seat.

Further, there is no suggestion in any of the known sunshield devices that provides an interior security arrangement comparable to that of the present invention.

SUMMARY AND OBJECTS OF THE INVENTION

Disclosed herein is a combination sunshield and interior protective cover means that generally comprises a sunshield formed in a peripheral configuration to adapt to the configuration of the windshield of the vehicle so that it can be readily mounted within the framework of the windshield. The sunshield is preferably so constructed as to cover the driver's side of the vehicle but it can be readily arranged to cover the entire height and width of the interior portion of the windshield. Since the two embodiments as disclosed herein are similar, except for the width, the description of one embodiment should suffice.

The present invention provides a single sunshield structure that comprises a single sheet of material formed having at least one side thereof covered with a reflective film or coating that is adapted to reflect the hot sun's rays.

The peripheral edge of the single sheet is suitably formed to enclose a single thin flexible loop or ring that, when in use, establishes a means for securely mounting the sunshade against the interior side of a vehicle windshield and still allows the sunshade to be readily folded in a compact storing arrangement similar to other known devices.

Fixedly secured along the lower edge of the sunshade is a sunshade cover sheet that extends rearwardly of the sunshield and which provides a dual purpose or means. One purpose is to establish a sunshade that covers a portion of the dashboard, the steering wheel and the front seat or seats and the adjacent areas within the vehicle. The other purpose is to provide a visual security means, whereby the cover sheet extends rearwardly of the windshield so as to cover the steering wheel and the entire front seat or seats so as to hide from view all of the area covered that is enclosed thereunder.

It is an important object of the present invention to provide a combination sunshield and interior protective cover means, wherein at least the area of the windshield of a vehicle in front of the driver's seat is protected from the sun's ray's by means of a sunshield. The sunshield includes a protective cover sunshade that extends rearwardly from the sunshield so as to cover at least a portion of the dashboard, the steering wheel and the driver's seat from the harmful rays of the sun, and provides a means to prevent a portion of the interior of the vehicle from being viewed from outside the automobile.

It is another object of the present invention to provide a sunshield in combination with an interior protective cover member that allows the sunshield portion thereof to be readably mounted behind the windshield of a vehicle so as to cover at least the driver's side of the vehicle, wherein the protective cover member defines a visual security device that is formed as an integral part of the sunshield which extends rearwardly as a cover sheet to enclose the steering wheel and the driver's seat.

It is still another object of the present invention to provide a single sunshield for automobiles that is constructed to cover the entire area of the vehicle windshield, and wherein the rearwardly extending cover is formed having a width and length that completely covers both the driver's side and the passenger's side of the vehicle, thereby protecting all of the dashboard, steering wheel and both front seats from the direct rays of the sun as well as blocking from view the enclosed area under the cover.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

BRIEF DESCRIPTION OF THE DRAWINGS

Novel features and advantages of the present invention in addition to those mentioned above will become apparent to those skilled in the art from reading the following detailed description in conjunction with the accompanying drawings wherein:

FIG. 1 is a pictorial view of the present invention wherein the combination sunshield and interior protective cover means for an automobile is shown in the mode for use, the vehicle being illustrated in phantom lines;

FIG. 2 is a top plan view showing the sunshield in a flat top plan view;

FIG. 3 is a side-elevational view thereof;

FIG. 4 is flat plan view thereof;

FIG. 5 is a schematic view showing a portion of a side view of a vehicle, wherein the present invention is mounted in a typical operating mode in which the interior cover sheet extends rearwardly of the windshield and attaches over the front seat or seats so as to cover the area defined therebetween; and FIG. 6 is a pictorial view showing a second embodiment of the present invention, wherein the windshield of the automobile is fully covered by the sunshield and the associated cover sheet covers both front seats, thereby hiding the enclosed area thereunder from view.

DESCRIPTION OF THE PREFERRED EMBODIMENT

Referring to the figures of the drawings wherein like reference numerals designate like elements throughout, FIG. 1 illustrates one of the preferred embodiments of the present invention which is defined as a combination automobile sunshield and interior protective cover means, indicated generally at 10, which is illustrated as being mounted within a vehicle that is shown in phantom lines, as indicated at 11. The present invention comprises a sunshield, designated generally at 12, having a substantially trapezoidal configuration or a configuration suitable to correspond to the configuration of a particular windshield. The upper and lower edges 14 and 16, respectively, of sunshade 12 are parallel to each other, and the opposite sides 18 and 20, respectively, are inclined so as to be adapted to engage one or both sides of the inner framework 22 of the vehicle windshield.

Sunshield 12 is formed with a peripheral rolled edge 23 in which is located a single elongated spring-like flexible band 24, as seen in the broken away portion of sunshade 12 in FIG. 2. This allows the sunshade to be easily twisted and folded for storage into a compact configuration consisting of a series of smaller concentric loops and fabric layers.

Sunshield 12 comprises a single sheet of flexible material 30 that has a reflective side 32 and a non-reflective side 34. The reflective side 32 is adapted to reflect sunlight and resulting heat radiation by being provided with a suitable fabric or sheet that has been coated with a metallic substance adapted specifically to reflect the impinging radiation from the sun away from the interior of the automobile. However, various other reflective fabrics or materials and even colored surfaces or a pure white surface can be employed. Due to recent advancements in reflective technology there are other types of reflective fabrics that can be employed. For the purpose of generality the term "metallized fabric" will be used generically to denote a fabric that reflects the sun's rays so as to prevent heat buildup and damage to the interior of an automobile or other vehicle.

The present invention further provides an interior protective means, generally indicated at 35, that has a dual purpose as a protective cover to provide, both a radiation protective means and a visual security means, both of which have not previously been combined with a sunshield. Accordingly, the protective cover 35 is fixedly secured along the lower edge 16 of sunshade 12 by a suitable attaching means such as by sewing or gluing the leading edge 36 of protective cover 35 to lower edge 16. Protective cover 35 is an elongated sheet of fabric that is identical in structure to that of the sunshield 12, as described above and seen in FIGS. 1 through 5 of the first embodiment. That is, one side of the protective cover 35 is formed with a reflective side or surface 38 and an opposite non-reflective side or surface 40. The non-reflective side 40, as illustrated the top plan view of FIG. 2, is positioned opposite that of the reflective side or surface 32 of the sunshield 12. The non-reflective side 34 of sunshield 12 is oppositely disposed to that of the reflective side 38 of protective cover 35, as seen in FIG. 4. As illustrated in FIG. 1, protective cover 35 is formed as an elongated sheet that extends rearwardly of the sunshield 12 so as to be positioned over the automobile dashboard 42 and steering wheel 44. The distal end of cover 35 is provided with an elastic member or band 46 that provides a means for removably attaching the cover over the seat 47 of the automobile. Thus, protective cover 35 is then positioned so as to protect the interior of the vehicle from the sun's rays as the sun continuously moves from one position to another during the day. Hence, the interior of the vehicle is protected from heat and deterioration that is caused by the effects of the sun's radiation, and thus cover 35 defines a radiation protective means. Another purpose of the protective cover 35 is to provide a security means, since the cover sheet 35 extends rearwardly over steering wheel 44 and the entire front seat 47, whereby there is established a visual security means by hiding from view all of the area covered.

Referring now to the arrangement as illustrated in FIG. 6, there is illustrated a sunshield 50 which extends lengthwise so that all of the windshield of the vehicle is covered. The protective cover 52 is enlarged across its width so as to completely encompass the entire front passenger and driver's side of the automobile. This not only covers the entire dashboard but all the area from the windshield rearwardly to include both the driver's seat 46 and the passenger's seat 48.

It is to be noted that both arrangements allow the outer free longitudinal edges 55 of the fabric structures to hang downwardly along their full length so as to extend below the lower window line. The arrangements of both embodiments provide a very suitable means for hiding from view the covered areas within the automobile.

The foregoing should only be considered as illustrative of the principles of the invention. Further, since numerous modifications and changes may readily occur to those skilled in the art, it is not desired to limit the invention to the exact construction and operation as shown and described, and accordingly, all suitable modifications and equivalents may be resorted to, falling within the scope of the claimed invention.

What is claimed is:

1. In combination a sunshield and an interior protective means, wherein said combination comprises:
   a sunshield having two surfaces, one being formed with a non-reflective surface and the other with a reflective surface suitable for reflecting impinging sunlight and resulting heat radiation;
   means for securing said sunshield within a vehicle so as to cover at least one half of the windshield of the vehicle;

an interior protective means attached to said sunshield having two surfaces, one being formed with a non-reflective surface and the other with a reflective surface so as to extend rearwardly of said sunshield to cover at least one front seat of the vehicle; and wherein said interior protective means defines a visual security means, wherein the area covered in the vehicle is enclosed under said protective cover means and hidden from view, and a radiation protective means defined by said reflective surface of said interior protective means.

2. The combination as recited in claim 1, wherein said interior protective means includes means for removably attaching said protective cover means over the front seat.

3. The combination as recited in claim 2, wherein said sunshield is formed having a size equal to or less than area of the windshield, wherein said interior protective means is defined by an elongated cover sheet that extends rearwardly over the steering wheel and the driver's seat of the vehicle, and wherein the longitudinal free edges of said cover sheet hang downwardly to block the covered area from view.

4. The combination as recited in claim 2, wherein said sunshield is formed having a configuration suitable to correspond to the overall configuration of the windshield.

5. The combination as recited in claim 4, wherein said sunshield is formed having a substantially trapezoidal configuration.

6. The combination as recited in claim 2, wherein said reflective surface of said sunshield is arranged to face outwardly of the windshield, whereby the impinging radiation from the sun is reflected outwardly from the interior of the vehicle and the non-reflecting surface of said sunshield faces inwardly of the interior of the vehicle, and wherein said reflective surface of said elongated cover sheet faces upwardly to reflect the impinging radiation of the sun and said non-reflecting surface of the elongated cover sheet faces downwardly over the enclosed covered area, thereby preventing heating and deterioration of the covered area.

7. The combination as recited in claim 6, wherein said means for removably attaching said protective cover means over the front seat comprises an elastic band.

8. An improved sunshield for mounting in the interior of a vehicle, comprising:

a sunshield having the outer facing surface thereof formed with a reflective surface suitable for reflecting impinging solar radiation, and a non-reflective surface facing inwardly of the interior of the vehicle;

means for securing said sunshield within a vehicle so as to cover the windshield of the vehicle;

means for protecting the interior of the vehicle from the sun's rays, said protective means being affixed to said sunshield and defined by an elongated rearwardly extending cover sheet; wherein said elongated rearwardly extending cover sheet is defined by a visual security means, wherein the area covered thereby is concealed from view from outside the vehicle; and wherein radiation protective means is defined by a reflective surface formed on said elongated rearwardly extending cover sheet that faces outwardly so as to reflect the impinging solar radiation as the sun moves over a given time period and range, whereby the steering wheel and at least the one of the front seats are covered and protected from the sun's rays entering any one of the windows of the vehicle.

9. The improved sunshield as recited in claim 8, wherein said interior protective means includes means for removably attaching said protective cover means over one or both of the front seats.

10. The improved sunshield as recited in claim 9, wherein said sunshield is formed having a size equal to or less than half the full length of the windshield.

11. The improved sunshield as recited in claim 9, wherein said sunshield is formed having a size and configuration equal to that of the windshield and wherein said cover sheet covers the dashboard, the steering wheel and both front seats, whereby the covered area is visually hidden from outside of the vehicle.

* * * * *